US007260085B2

(12) United States Patent
Dobbins et al.

(10) Patent No.: US 7,260,085 B2
(45) Date of Patent: Aug. 21, 2007

(54) SYSTEM AND METHOD FOR DETERMINING A DESTINATION FOR AN INTERNET PROTOCOL PACKET

(75) Inventors: Ephraim Webster Dobbins, Windham, NH (US); Ajay Manuja, Cambridge, MA (US)

(73) Assignee: Acme Packet, Inc., Burlington, MA (US)

( * ) Notice: Subject to any disclaimer, the term of this patent is extended or adjusted under 35 U.S.C. 154(b) by 1048 days.

(21) Appl. No.: 10/103,408

(22) Filed: Mar. 21, 2002

(65) Prior Publication Data

US 2003/0179761 A1    Sep. 25, 2003

(51) Int. Cl.
*H04L 12/66* (2006.01)
(52) U.S. Cl. ...................... 370/352; 370/392
(58) Field of Classification Search ............. None
See application file for complete search history.

(56) References Cited

U.S. PATENT DOCUMENTS 6,041,058 A * 3/2000 Flanders et al. ............ 370/401
6,065,064 A * 5/2000 Satoh et al. ................ 709/249

(Continued)

FOREIGN PATENT DOCUMENTS

EP    0845889 A2    6/1998

(Continued)

OTHER PUBLICATIONS

McAuley, et al., "Fast Routing Table Lookup Using CAMs", Networking: Foundation for the Future, San Francisco, Mar. 28-Apr.1, 1993, Proceedings of the Annual Joint Conference of Computer and Communications Societies (INFOCOM), Los Alamitos, IEEE, Comp. Soc. Press, US, vol. 2, Conference 12.

(Continued)

*Primary Examiner*—Chau Nguyen
*Assistant Examiner*—Jung Park
(74) *Attorney, Agent, or Firm*—Thomas, Kayden, Horstemeyer & Risley, LLP

(57) ABSTRACT

A system and method for determining a destination for an Internet protocol packet. Generally, with reference to the structure of the system, the system utilizes a memory and a processor. The processor is instructed by the memory to perform the steps of: searching a memory for a destination Internet protocol address associated with the Internet protocol packet, the memory organized into a series of rows, each row including one destination Internet protocol address column, one weight value column, and one destination media access control address column, wherein at least one of said rows comprises a destination Internet protocol address having at least one universal bit, wherein universal bits are bits that accept any value, use of said universal bits ensuring that said step of searching said memory for said destination Internet protocol address associated with said Internet protocol packet results in said memory always having said destination Internet protocol address therein; utilizing said weight factor to select, from the series, a row matching the destination Internet protocol address; reading a destination media access control address column from the selected row; discarding said Internet protocol packet if a value of the destination media access control address is zero; and adding the media access control address to the Internet protocol packet as the destination of the packet, if the destination media access control address is not equal to zero.

13 Claims, 9 Drawing Sheets

U.S. PATENT DOCUMENTS

| | | | |
|---|---|---|---|
| 6,256,314 B1* | 7/2001 | Rodrig et al. | 370/401 |
| 6,546,391 B1* | 4/2003 | Tsuruoka | 707/8 |
| 6,912,223 B1* | 6/2005 | Sloane | 370/401 |
| 6,931,452 B1* | 8/2005 | Lamberton et al. | 709/242 |
| 6,987,768 B1* | 1/2006 | Kojima et al. | 370/401 |
| 2002/0018442 A1* | 2/2002 | Okada | 370/227 |
| 2004/0001492 A1* | 1/2004 | Johnson | 370/395.32 |

FOREIGN PATENT DOCUMENTS

WO     WO00/79733 A2     12/2000

OTHER PUBLICATIONS

Schulzrinne et al., "RTP: A Transport Protocol for Real-Time Applications," Network Working Group, Jan. 1996, pp. 1-66.
Swale et al., "Requirements for the MIDCOM Architecture and Control Language," MIDCOM Working Group, Internet Draft, Feb. 2001, pp. 1-24.
Srisuresh et al., "Middlebox Communication Architecture and Framework," Network Working Group, Internet Draft, Feb. 2001, pp. 1-37.
Martin et al., "SIP Through NAT Enabled Firewall Call Flows," Midcom Working Group, Internet Draft, Feb. 2001, pp. 1-63.
Rosenberg et al., "Getting SIP through Firewalls and NATs," Internet Engineering Task Force, Internet Draft, Feb. 22, 2000, pp. 1-57.
Eliot Lear, "A Middle Box Architectural Framework," Network Working Group, Internet Draft, Jan. 31, 2001, pp. 1-12.
Rosenberg et al., "SIP Traversal through Residential and Enterprise NATs and Firewalls," Internet Engineering Task Force, Internet Draft, Mar. 2, 2001, pp. 1-41.
Carpenter et al., "Middleboxes: Taxonomy and Issues," The Internet Society, Internet Engineering Task Force, Internet Draft, Apr. 2001, pp. 1-24.
B. Biggs, "A SIP Application Level Gateway for Network Address Translation," Internet Draft, Mar. 2000, pp. 1-16.
Kuthan et al., "Middlebox Communication: Framework and Requirements," Internet Engineering Task Force, Internet Draft, Nov. 2000, pp. 1-23.
P. Srisuresh, "Framework for Interfacing with Network Address Translator," NAT Working Group, Internet Draft, Apr. 2000, pp. 1-58.
Mart et al., "Firewall Control Requirements," MidCom Bof, Internet Draft, Nov. 2000, pp. 1-16.
Melinda Shore, "H.323 and Firewalls: Problem Statement and Solution Framework," Internet Draft, Feb. 3, 2000, pp. 1-19.
Thernelius et al., "SIP Firewall Solution," SIP Working Group, Internet Draft, Jul. 2000, pp. 1-32.
N. Freed, "Behavior of and Requirements for Internet Firewalls," Network Working Group, Internet Draft, Oct. 2000, pp. 1-14.
D. Newman, "Benchmarking Terminology for Firewall Performance," Network Working Group, The Internet Society, Aug. 1999, pp. 1-51.
F. Finlayson, "IP Multicast and Firewalls," Network Working Group, The Internet Society, May 1999, pp. 1-23.
S. Bellovin, "Firewall-Friendly FTP," Network Working Group, Feb. 1994, pp. 1-7.
Montenegro et al., "Sun's SKIP Firewall Traversal for Mobile IP," Network Working Group, The Internet Society, Jun. 1998, pp. 1-45.
Gaynor et al., "Firewall Enhancement Protocol (FEP)," Network Working Group, The Internet Society, Apr. 1, 2001, pp. 1-22.
Dr. Andrew Molitor, "A Firewall Solution for Voice Over IP," Aravox Report, Aravox Technologies, pp. 1-2.
"Aravox Firewall Benefits," Aravox Technologies, pp. 1-9.
Dr. Andrew Molitor, "Can Voice Over IP Work Without Dynamic NAT?," Aravox Report, Aravox Technologies, pp. 1-2.
Dr. Andrew Molitor, "Deploying a Dynamic Voice over IP Firewall with IP Telephony Applications," Aravox Report, Aravox Technologies, pp. 1-5.
Dr. Andrew Molitor, "Firewall Control for IP Telephony," Aravox Report, Aravox Technologies, pp. 1-5.
Molitor et al., "High Performance H.323 Firewalling for VoIP Solutions," Aravox Report, Aravox Technologies, pp. 1-2.
"What is Unique about IP Telephony?," Aravox Technologies, Spring 2001 IT Expo, pp. 1-16.
Dr. Andrew Molitor, "Securing VoIP Networks with Specific Techniques, Comprehensive Policies and VoIP-Capable Firewalls," Aravox Report, Aravox Technologies, pp. 1-3.
Utz Roedig, "Security Analysis of IP-Telephony Scenarios," Presentation by Darmstadt University of Technology, pp. 1-28.
Fredrik Thernelius, "SIP, NAT, and Firewalls," Master Thesis, Ericsson, May 2000, pp. 1-69.
Steven M. Bellovin, "Distributed Firewalls" ;login: Magazine, Nov. 1999, pp. 37-39 (1-10).
"Firewall ActiveX Control for Microsoft Windows," Distinct Corporation, 1998, pp. 1-45.
Jiri Kuthan, "Firewall Control," Flow Processing Control Protocol, pp. 1-3.
Alan Crosswell, "Advanced Networking Information, " Columbia University Academic Information Systems, Mar. 21, 2000, pp. 1-22.
"Cisco Secure PIX Firewall Software v5.2," Cisco Data Sheet, pp. 1-7.
"Cisco Secure PIX 500 Firewalls," Cisco Products & Technologies, 2000, pp. 1-3.
"Cisco Secure PIX Firewall," Internet Product Watch, Apr. 12, 2001, pp. 1-2.
"Media Firewall," www.marconi.com, 2000, pp. 1-4.
"Media Firewall," www.marconi.com, 2001, pp. 1-3.
"ATM Switch Network Modules: LAN, WAN, and Service Interfaces for TNX-210, TNX-1100, ASX-200BX, ASX-1000 and ASX-1200 ATM Switches," www.marconi.com, 2000, pp. 1-12.
"Marconi's Next Generation IP and Multi-Service Switch Router Enables End-to-End Differentiated Services," www.marconi.com, Nov. 6, 2000, pp. 1-3.
"Transforming Communications and Information with Enterprise-Focused Ethernet Solutions," www.marconi.com., pp. 1-6.
"Marconi Expands Networking Product Portfolio with Solutions for Emerging Enterprise Needs," www.marconi.com, Jul. 24, 2000, pp. 1-2.
"Marconi to Showcase 'Smart and Fast' Switch/Router at CeBIT," www.marconi.com, Jan. 22, 2001, pp. 1-2.
"Marconi Demonstrates Converged Distance-Learning Solutions at Educause 2000," www.marconi.com, Oct. 10, 2000, pp. 1-2.
"Firewall Security," www.marconi.com, Oct. 30, 2000, pp. 1-2.
"SA-400, IP/ATM Firewalling for ATM Networks," www.marconi.com, 2000, pp. 1-4.
"Media Firewall," www.marconi.com, 2001, pp. 1-3.
"NSX-9500, Routing, LANE, and Firewalling Services for ATM Backbone Networks," www.marconi.com, 2000, pp. 1-4.
"The New Public Network: Scalable, Flexible, PSTN Features, IN Features, Signalling Gateway," www.marconi.com, 1999, pp. 1-4.
"Sphericall Voice Internetworking Multiplexer (VIM) Product Overview," www.marconi.com, 2001, p. 1.
"ServiceOn Accountant 2.0: Per-call Usage Based Billing for Differentiated Services," www.marconi.com, Dec. 12, 2000, pp. 1-2.
"Marconi Extends Optical Networking; Introduces Advanced Multiservice Platform," www.marconi.com, Jun. 6, 2000, pp. 1-2.
"ATM Switched Network Modules Product Overview," www.marconi.com, 2001, pp. 1-4.
"Security is the Key," Marconi Interface, May 2000, p. 30.
"Firewall Switching Agent," www.marconi.com, 2001, pp. 1-4.
"ESX-2400 and ESX-4800 Firewall Accelaration Switches," www.marconi.com, 2001, pp. 1-8.
"ESX-2400 and ESX-4800 Product Overview," www.marconi.com, 2001, pp. 1-3.
"FSA Product Overview," www.marconi.com, 2001, pp. 1-2.
Parthenios, "Hackers Beware," Telephony, Jun. 18, 2001, pp. 1-2.
"Aravox Expands IP Platform to Include VoIP," CommWeb.com, May 30, 2001, p. 1.
"Aravox Expands IP Network Services Platform to Carriers and xSP's Deploying VoIP," biz.yahoo.com., May 29, pp. 1-2.
"Aravox Expands IP Network Services Platform to Carriers and Service Providers Deploying VoIP," TMCnet.com, May 29, 2001, pp. 1-2.

"Solutions,": www.aravox.com/solutions, 2001, p. 1.
"The Aravox Network Services Platform Solution for Backbone Carriers," www.aravox.com/backbone, 2001, p.1.
"The Aravox Network Services Platform Solution for Access Providers," www.aravox.com/access, 2001, p. 1.
"The Aravox Network Services Platform Solution for Enterprises," www.aravox.com/enterprise, 2001, p. 1.
"SIP ALG for Firewall Traversal (Application Level Gateway)," www.microappliances.com, 2000, p. 1.

"SIP Firewall/Outbound Proxy Server (ALG)," www.microappliances.com, 2000, p. 1.
"Microappliances SIP Phone (ActiveX)," www.microappliances.com, 2000, p. 1.
"Convergence Data and Telephony Platform," www.microappliances.com, 2000, p. 1.

* cited by examiner

| DESTINATION IP ADDRESS 304 | WEIGHT 306 | DESTINATION MAC ADDRESS 308 |
|---|---|---|
| | | |
| | | |
| | | |
| | | |
| | | |

FIG. 8

| DESTINATION IP ADDRESS 302 | WEIGHT 304 | MAC ADDRESS 306 |
|---|---|---|
| 1.1.1.1 | 127 | 0:0:0:0:0:1 |
| 1.1.1.2 | 127 | 0:0:0:0:0:2 |
| 1.1.1.3 | 127 | 0:0:0:0:0:3 |
| 1.1.1.X | 64 | 0:0:0:0:0:0 |
| X.X.X.X | 32 | 1:2:3:4:5:6 |

FIG. 9

SYSTEM AND METHOD FOR DETERMINING A DESTINATION FOR AN INTERNET PROTOCOL PACKET

CROSS-REFERENCE TO RELATED APPLICATIONS

This application incorporates the following references in their entirety: U.S. Patent application entitled "System and Method for Determining Flow Quality Statistics for Real-Time Transport Protocol Data Flows," filed on Jul. 23, 2001, and having Ser. No. 09/911,256; U.S. application entitled "System and Method for Providing Rapid Rerouting of Real-Time Multimedia Flows," filed on Jul. 23, 2001, and having U.S. Pat. No. 7,031,311; U.S. patent application now U.S. Pat. No. 7,031,311 entitled "System and Method for Providing Encryption for Rerouting of Real-Time Multimedia Flows," filed on Aug. 28, 2001, and having Ser. No. 09/941,229; and U.S. patent application entitled, "System and Method for Improving Communication Between a Switched Network and a Packet Network," filed Nov. 2, 2001, having U.S. Pat. No. 7,142,532.

FIELD OF THE INVENTION

The present invention generally relates to telecommunications and, more particularly, is related to a system and method for improving communication between a switched network and a packet network.

BACKGROUND OF THE INVENTION

The public switched telephone network (PSTN) has evolved into an efficient real-time, multimedia communication session tool wherein users can pick up any one of nearly one billion telephones and dial any one of nearly one billion endpoints. Several developments have enabled this automated network, such as numbering plans, distributed electronic switching and routing, and networked signaling systems.

Similar to the manner in which the PSTN is based on a hierarchy, the Internet is based on an Internet protocol (IP). Multimedia packets are routed or forwarded from one link to the next (i.e., from a source of a data flow to a destination of the data flow). Each multimedia packet comprises an IP address, which, in Internet protocol version 4 (IPv4), for example, has 32 bits. Each IP address also has a certain number of bits dedicated to a network portion and a certain number of bits dedicated to a host portion.

IP routers are used to transmit a multimedia packet from one network (or link) and place the packet onto another network (or link). Tables are located within IP routers, wherein the tables contain information or criteria used to determine a best way to route the multimedia packet. An example of this information may be the state of network links and programmed distance indications. By using intelligent devices on both sides of a network domain, it is possible to allocate a temporary address to route a multimedia packet through a network and restore the original address on the far side of the network when the packet leaves the network. This is the basis for many current virtual private network (VPN) products and is understood in the art.

To ensure that the network elements (e.g., switches in the telephone network, routers in the data network) can perform their associated tasks, it helps for the network elements to know the status of adjacent communication links and available routes; signaling systems are used to provide this information. In telephone networks, signaling systems used are either signaling system number 7 (SS7) or are equivalent to SS7. An SS7 network is separate from a voice network, and is used for the purpose of switching data messages pertaining to the business of connecting telephone calls and maintaining the signaling network. In addition, the SS7 digital signaling standard is utilized to interface the PSTN to the IP world. As is known by those skilled in the art, SS7 utilizes a message structure wherein messages travel from one network entity to another, independent of the actual voice and data to which they pertain. This message structure utilizes an envelope, referred to as a packet, for traversing messages.

During transmission of a multimedia packet to a destination, network elements may change source and/or destination addresses for the multimedia packet. Unfortunately, the process of determining and changing source and destination addresses within multimedia packets is time consuming, thereby inhibiting high-speed multimedia packet transmission.

SUMMARY OF THE INVENTION

In light of the foregoing, the preferred embodiment of the present invention generally relates to a system for determining a destination for an Internet protocol packet.

Generally, with reference to the structure of the routing system, the system utilizes a memory and a processor, wherein the processor performs the steps of: searching the memory for a destination Internet protocol address associated with the Internet protocol packet; reading a destination media access control address identified by the destination Internet protocol address; dropping the Internet protocol packet if a value of the destination media access control address is zero; and adding the media access control address to the Internet protocol packet as the destination of the packet, if the destination media access control address is not equal to zero. In addition, the memory is preferably a content addressable memory.

The present invention can also be viewed as providing a method for determining a destination for an Internet protocol packet. In this regard, the method can be broadly summarized by the following steps: searching a memory for a destination Internet protocol address associated with the Internet protocol packet; reading a destination media access control address identified by the destination Internet protocol address; dropping the Internet protocol packet if a value of the destination media access control address is zero; and adding the destination media access control address to the Internet protocol packet as the destination of the packet, if the media access control address is not equal to zero.

Other systems and methods of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

FIG. 8 is a block diagram further illustrating the content addressable memory of FIG. 3.

FIG. 9 is a block diagram of a layer two binding table that is utilized to provide an example of universal selection bit use.

DETAILED DESCRIPTION OF THE PREFERRED EMBODIMENT

Figure 1:
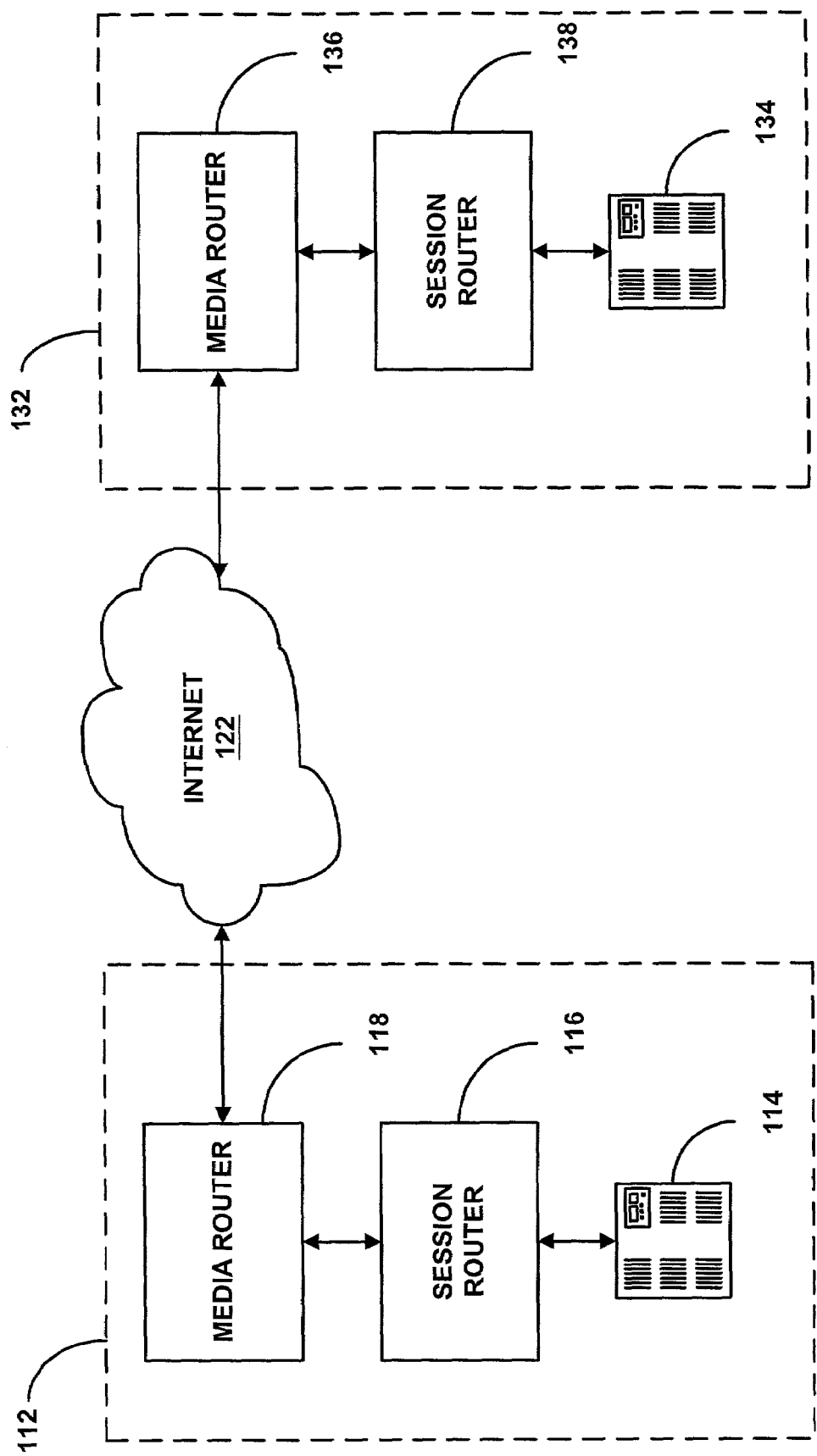
FIG. 1 is a block diagram that illustrates a communication network for implementation of the present routing system.

The routing system of the present invention can be implemented in software, firmware, hardware, or a combination thereof. In the preferred embodiment of the invention, which is intended to be a non-limiting example, a portion of the system is implemented in software that is executed by a network processor.

The software based portion of the routing system, which comprises an ordered listing of executable instructions for implementing logical functions, can be embodied in any computer-readable medium for use by, or in connection with, an instruction execution system, apparatus, or device such as a computer-based system processor containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

In the transmission of multimedia packets from a first endpoint to a second endpoint it is desirable to process multiple available transmission routes and to select a best route from the available transmission routes. An example of a system that provides for route processing and selection is provided by the co-pending U.S. patent application entitled, "System and Method for Assisting in Controlling Real-time Transport Protocol Flow Through Multiple Networks via Multimedia Flow Routing," by MeLampy, et. al., filed on Jul. 23, 2001, and having Ser. No. 09/911,256 (hereinafter, "the '256 patent application"), the disclosure of which is hereby incorporated by reference in its entirety. It should be noted that multimedia comprises at least, text, graphics, video, animation, voice, data, and/or discrete media.

The '256 patent application teaches use of a session router to select multiple routes and process the routes in order, selecting from a set of session initiation protocol (SIP) agent(s) that are otherwise equal, by using various distribution strategies. The above process results in managing the path of a resulting real-time transport protocol (RTP) flow. The U.S. patent application entitled "System and Method for Providing Rapid Rerouting of Real Time Multi-media Flows," by MeLampy, et. al., filed on Jul. 23, 2001, having U.S. Pat. No. 7,031,311 (hereinafter "the '311 patent"), the disclosure of which in hereby incorporated by reference in its entirety, teaches use of media routers for guiding the resulting RTP flows selected and processed by the session router through certain thresholds. Therefore, the combination of the abovementioned '256 application and '304 patent creates a high-quality border between various IP networks. Without these mechanisms, data packets would flow whichever way networks would allow.

FIG. 1 is a block diagram that illustrates a communication network 102, wherein the use of session routers and media routers is demonstrated, for implementation of the present routing system. As shown by FIG. 1, a first carrier network 112 comprises a first SIP phone 114, such as those produced by Pingtel of Massachusetts, U.S.A., a first session router 116, and a first media router 118. A second carrier network 132, which is connected to the first carrier network 112 via an Internet 122, comprises a second SIP phone 134, a second session router 138, and a second media router 136. It should be noted that any device, SIP or non-SIP, may be included within the first and second carrier networks 112, 132 that requires communication between the networks 112, 132. Other data sources include, but are not limited to, integrated access devices (IAD), VoIP gateways (Cisco AS5300, Sonus GSX), and multimedia sources (PCs, IP-PBXs). Further, communication between the networks 112, 132 may instead be provided via a wide area network (WAN) or local area network (LAN). Also, the Internet 122, may instead be a public or private data network domain since the media routers 118, 136 are utilized between two domains, or carrier networks, within the Internet 122.

Alternatively, a router, such as, but not limited to, a border router, may be located between the first and second media routers 118, 136 to assist in communication between the first and second carrier networks 112, 132. Communication from the first SIP phone 114 to the second SIP phone 134 may instead be provided by the first and second media routers 118, 136, as is further explained in detail hereinbelow. It should be noted, however, that an additional router, such as a border router, is not necessary in providing communication between the first and second carrier networks 112, 132. It should also be noted that communication may be from a session router 116, 138, directly to the Internet 122, and not through the media routers 118, 136.

The first and second session routers 116, 138 provide SIP and telephony routing over IP (TRIP) support as described in detail by the presently pending application titled, "System and Method for Assisting in Controlling Real-Time Transport Protocol Flow Through Multiple Networks," by MeLampy et. al., having Ser. No. 09/844,204, and being filed on Apr. 27, 2001, the disclosure of which is incorporated herein by its entirety.

Figure 2:
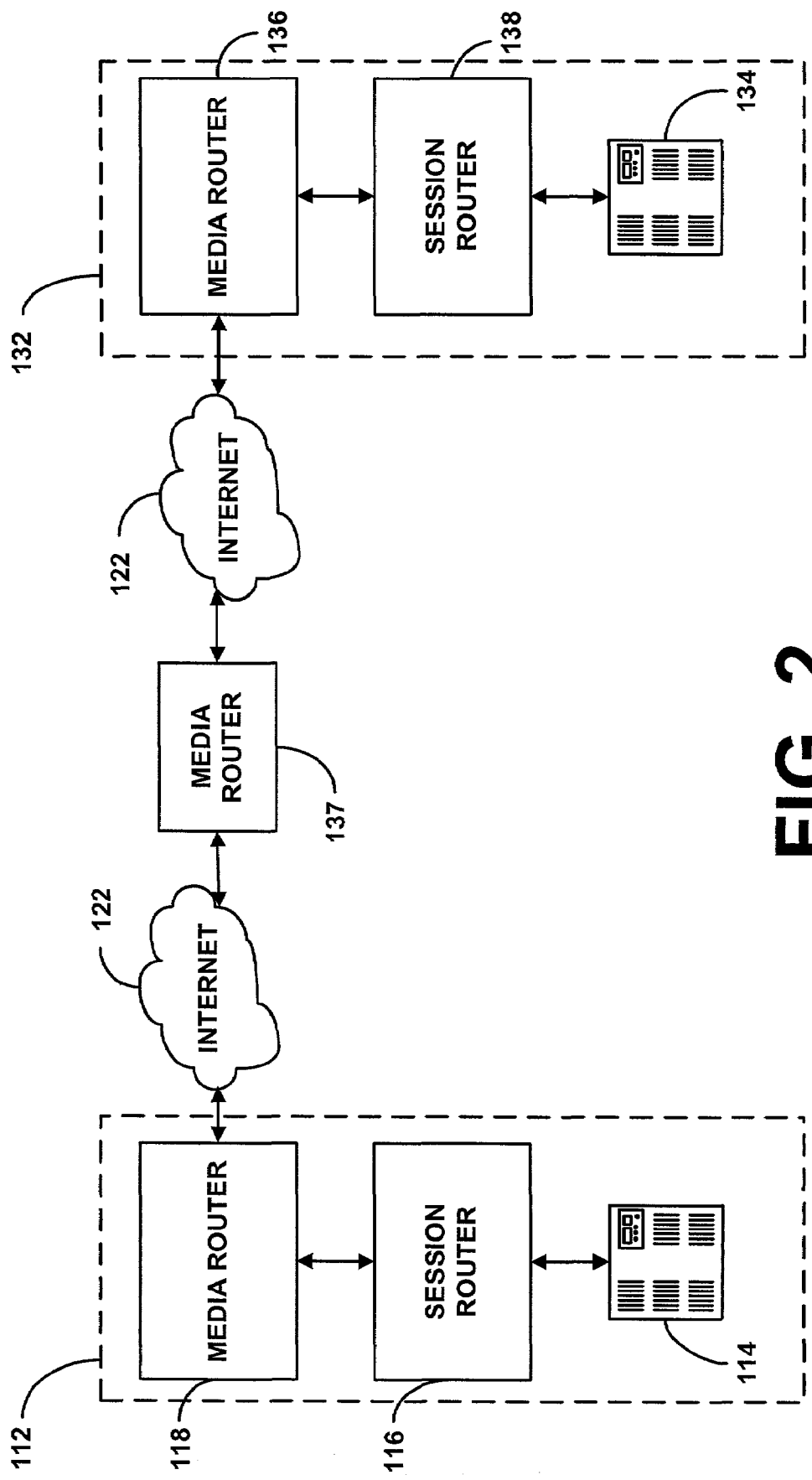
FIG. 2 is a block diagram that illustrates an alternate embodiment of the invention wherein three media routers are utilized, as opposed to the two media routers that are utilized by the communication network of FIG. 1.

Additional media routers may be provided between the first media router 118 and the second media router 136. FIG. 2 is a block diagram that demonstrates use of three media routers instead of two, in accordance with an alternate embodiment of the invention. As such, the first media router 118, located within the first carrier network 112, communicates with a third media router 137, via the Internet 122. The third media router 137, in turn, communicates with the second media router 136, within the second carrier network 132, via the Internet 122. To reiterate, communication from a first media router may be to a second media router, a session router, a SIP device, and/or a non-SIP device located in a LAN, WAN, or otherwise.

Figure 3:
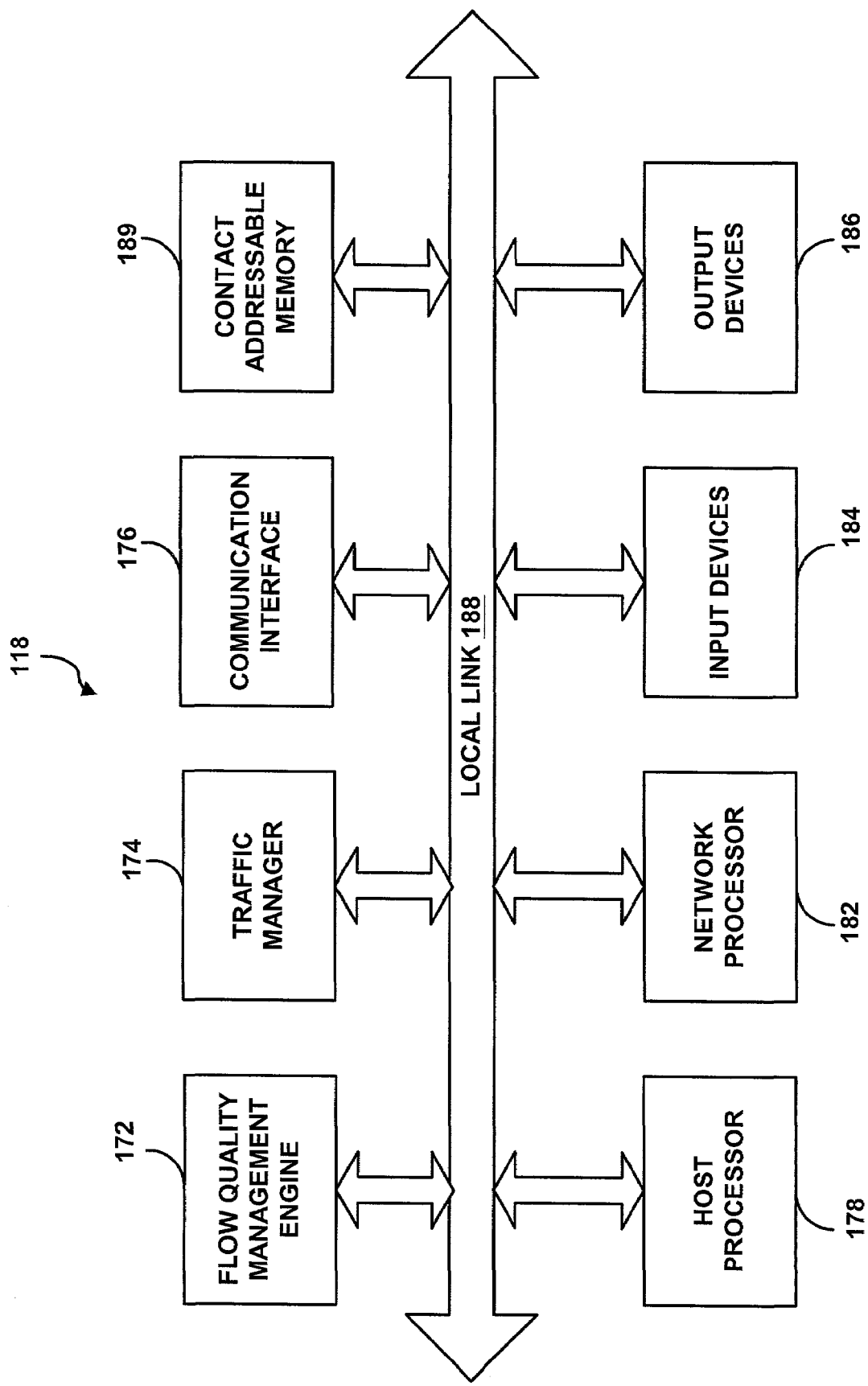
FIG. 3 is a block diagram further illustrating the media router of FIG. 1.

The introduction of media routers into the real-time multimedia flow forces multimedia packets through a known interface. FIG. 3 is a block diagram further illustrating a media router (hereafter 118). As is shown by FIG. 3, the media router 118 comprises a flow quality management engine 172, a traffic manager 174, a communication interface 176, a host processor 178, a network processor 182, input devices 184 and output devices 186, and a content addressable memory (CAM) 189, or any external search engine, all of which communicate within the media router 118 via a local link 188. Each of the above mentioned, except the CAM 189, is described in detail in the presently pending '311 patent.

Specifically, the traffic manager 174 is preferably used for measuring and enforcing IP session multimedia flow rates, or traffic, for providing traffic measurement. An example of a commercially available traffic manager 174 is an NPX5700 traffic manager sold by MMC Networks located in California, USA. Essentially, the traffic manager 174 measures the number of multimedia packets that flow through the communication interface 176. The traffic manager 174 works with the network processor 182 so that once a forwarding decision has been made by the media router 118, the traffic manager 174 queues the received packet into its respective IP flow and associated priority.

The traffic manager 174 comprises a memory (not shown) for temporarily storing received multimedia packets. From an inbound perspective, the traffic manager 174 is able to monitor RTP multimedia flows and enforce maximum data rates by either dropping multimedia packets or marking them as eligible for discarding if they are outside a bandwidth allocated for the multimedia flow. The traffic manager 174 may also be instructed by the session router (hereafter 116) to accept a specific amount of multimedia in accordance with an allocated bandwidth and bit rate. Therefore, if multimedia is received at a higher bit rate than allowed by the session router 116, the multimedia received at the higher bit rate is not transmitted. It should be noted that the characteristics specified by the session router 116 may instead be programmed directly into the media router 118 without using the session router 116.

The flow quality management engine 172 measures and stores observed flow quality for individual unique multimedia flows. The flow quality management engine 172 also detects and corrects upstream and downstream failures in the transmission of multimedia packets.

The network processor 182, via use of the content addressable memory 189, provides translation services, comprising the capability to translate a source address, destination address, source port, destination port or any combination of these fields. The network processor 182 is also capable of removing and/or inserting a multi-protocol label switching (MPLS) tag in an IP header of a multimedia packet. Header removal is further described below. In addition, the network processor 182 is capable of inserting and/or modifying a diffserv codepoint located within the IP header of the multimedia packet, which is used to modify priority of multimedia packets.

The quality measurement services provided by the flow quality management engine 172 are provided on a per flow basis, wherein a multimedia flow is defined by a source IP address, a destination IP address, a source port, a destination port, a source virtual local access network (VLAN), and/or a destination virtual local access network (VLAN). Quality measurement preferably comprises maintaining current statistics for the flow within the network processor 182, as well as aggregate and min/max statistics for the flow where applicable. Examples of statistics that may be collected include latency, jitter and packet loss for a pre-defined window of time. It should be noted that the window of time can be specified via the session router 116 or the media router 118. Aggregate statistics may include transmitted multimedia packets, dropped multimedia packets and duplicate multimedia packets. Minimum and maximum statistics, otherwise referred to as boundary statistics, may also be collected which may include latency, jitter and packet loss per window of time.

The host processor 178, similar to the traffic manager 174, provides detection and correction of upstream and downstream failures. Methods used by the host processor 178 to detect and correct upstream and downstream failures in the transmission of multimedia packets include, but are not limited to, the use of link failures and external management events.

The content addressable memory 189 is used to store translations and/or bindings previously determined by "open/bind" requests for fast access by the network processor 182. Open/bind requests are discussed in detail within the '304 patent application. The content addressable memory 189 may also be used to store media access control addresses to IP mappings for cases where the output devices 186 are Ethernet type devices. An example of a content addressable memory is manufactured by Netlogic Microsystems, Inc, of Mountain View, Calif.

The media router 118 is capable of generating flow quality statistics for RTP multimedia flows. Further, the media router 118 is able to generate the flow quality statistics from the RTP packets as they flow through the communication network 102. In some cases the statistics are only relevant for the link between media routers, as shown by FIG. 1.

Preferably, one or more statistics are stored for each flow through the media router 118. These statistics may include, but are not limited to, latency, jitter, a number of octets per packet, and/or the number of dropped packets. It should be noted that other statistics may also be stored with regard to each multimedia flow through the media router 118. To generate statistics for each multimedia flow, the media router 118 runs a proprietary version of a protocol, such as, but not limited to, real-time transport control protocol (RTCP), between connected media routers to determine latency. Jitter and dropped packet statistics can be generated autonomously by the media router 118. The following describes how latency, jitter and dropped multimedia packets can be determined in the absence of RTCP information.

In order to measure latency for a data flow, the media router 118 communicates with another endpoint on the multimedia flow. Presumably, the other endpoint is another media router, although the endpoint need not be. Preferably, the subject of this communication is a test packet that the endpoint loops back to the media router 118 attempting to determine RTP data flow latency. The media router 118 receiving the looped packet compares when the packet was received to when the packet was sent, thereby determining a round trip time. The round trip time is then cut in half to approximate the one-way time, which is the latency.

Rather than using a proprietary way to perform packet looping, RTCP packet format can be used between two media routers. This format allows extraction of a timestamp of the sender (from a send report) and placing the timestamp into the looped packet (in a receive report), as well as an estimate of how long it took to loop the packet.

Jitter is a measurement of the variation of the gap between packets on a flow. An alternative definition is that jitter is the variance in latency for a multimedia flow. The media router 118 can measure jitter for an RTP data flow as the RTP data flow transits the media router 118. When a multimedia packet reaches a network processor 158, which is also located within the media router 118, a timer is started that continues until the next multimedia packet for that RTP data flow arrives. The gap between multimedia packets is added to an aggregate to maintain a "mean" jitter value. The "mean" jitter value can also be compared to a min/max value in a flow record to determine if a new min/max jitter value is established. It should be noted that the flow record may be located within a network processor memory (not shown) that is located within the network processor 182. It should also be noted that the memories located within the media router 118 may all be located within a single memory stored within, or outside of the media router 118. In the situation where this process may be too processor intensive, jitter samples can be aggregated and min/max calculations can be performed on a periodic basis using the aggregated information.

Dropped packets are determined by computing net lost packets sequentially. When a multimedia packet flow begins a sequence number assigned to a received multimedia packet is observed. The observed sequence number is stored and incremented by one to provide a next expected sequence number, which is also stored. It should be noted that information stored with reference to lost packets may be stored within the network processor memory or within any other memory.

It is generally expected that the multimedia packets will flow in order. If a sequence number greater than the next expected sequence number is received, the expected sequence number is subtracted from the received sequence number and the result is stored within a "lost packets" counter. Each time a sequence number is below and expected sequence number value, the "lost packets" counter is decremented by one and the next expected sequence number is not changed. Over time, this process will accurately measure the number of lost packets. The following table provides an example of packet sequence numbers arriving and lost packet calculation performed as a result.

TABLE 1

| Sequence Received | Next Expected Packet | Lost Packets |
| --- | --- | --- |
| At Start | Undefined | Undefined |
| 1 | 2 | 0 |
| 2 | 3 | 0 |
| 4 | 5 | 1 |
| 10 | 11 | 6 |
| 8 | 11 | 5 |

Table 1 demonstrates how lost packets may be tracked. Note that when packet sequence number 8 is received, the next expected packet sequence number is not changed, instead, one is subtracted from the lost packets counter. In the above example, five lost packets are measured, specifically, sequence numbers 3, 5, 6, 7, and 9. Alternatively, the above calculations may be improved further by utilizing timers for packets that are received that have values that are lower than the next expected sequence number. As an example, when packet sequence number 8 is received, a check may be performed to determine if receipt was within a particular window of time corresponding to the jitter buffer.

Alternatively, an exact count of the dropped packets may be obtained using two scoreboard arrays of booleans that are used to track when a packet is missing, and whether the packet appears within a jitter window. Alternate methods of processing packets may be used. It should be noted that a jitter window is typically implemented in voice gateways to compensate for fluctuating network conditions. The jitter window is a packet buffer that holds incoming packets for a specified amount of time before forwarding them for decompression. The process has the effect of smoothing the packet flow, thereby increasing the resiliency of a compressor/decompressor (CODEC) to packet loss, delaying packets, and producing other transmission effects. Preferably, the jitter window is defined by a session router 116, although it may be directly defined via the media router 118.

Each entry in a scoreboard array represents whether a packet having a specific sequence number has been received by a media router. The scoreboard array may be located within the network processor memory or within any local or distant memory. Each array of booleans also has a counter which tracks how many entries have been marked "missing." Preferably, all entries are initially marked as "received."

As the sequence numbers are tracked in the network processor 182, missing packets are detected, specifically, a packet with a sequence number that has incremented more than one, the appropriate entry in the current array is marked "missing" and the missing counter is incremented. Preferably, two arrays are sized as the maximum number of packets in the jitter window. These two arrays are hereinafter referred to as the current array and the aged array. When the current array reaches the maximum jitter window the aged array is re-initialized and becomes the current array and the current array becomes the aged array. Before the aged array is erased, the counter for dropped packets is retrieved and accumulated for the data flow.

If, instead, an out of order old packet is received, wherein the sequence number is less than the current sequence number, the network processor 182 looks up the entry for the sequence number in either the current or aged array depending on lateness of the packet. If the network processor 182 finds the entry marked missing and changes the entry, the network processor 182 then decrements a missing packet counter of the array that is used for keeping track of missing packets. If the packet is not marked as missing, then the network processor 182 designates that the packet is a duplicate. If the sequence number is so old that the packet dates back further than the depth of the jitter window, then the network processor 182 does not perform a lookup. It should be noted that this method of performing dropped packet counting is more accurate than that obtainable using RTCP.

In accordance with the present invention, the network processor 182 is also utilized to provide high-speed transmission of the multimedia packets to a specified destination via the communication interface 176. The following describes high-speed multimedia transmission is enabled by the network processor 182.

High-speed Multimedia Transmission

Figure 4:
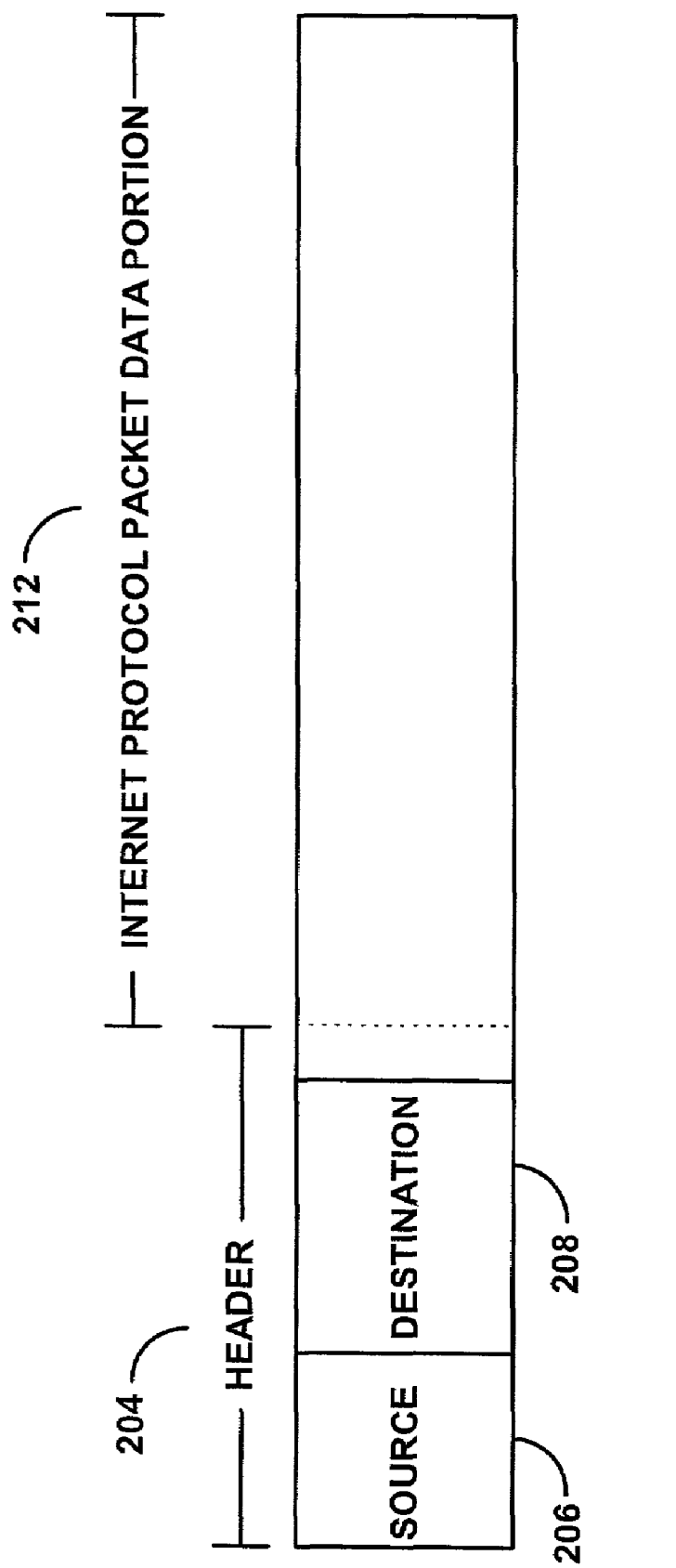
FIG. 4 is a diagram illustrating parts of a multimedia packet that may be received by the media router of FIG. 3.

Multimedia packets received by the media router 118 comprise a header and an IP packet data portion. FIG. 4 is a diagram illustrating the above mentioned parts of a multimedia packet 202. The header portion 204 of a multimedia packet 202, at a minimum, comprises at least a source portion 206 and a destination portion 208, wherein the source portion 206 identifies a source address from which the packet arrived, and the destination portion 208 identifies a destination address to which the packet 202 is addressed.

The network processor 182 performs a series of actions upon the received multimedia packet 202 after receipt by the media router 118. Generally, a level two header, such as, but not limited to, a link protocol header, or layer two header, is removed from the received multimedia packet. An example of a link protocol header may include, but is not limited to, an Ethernet header or HDLC header. The layer two header is removed so that a layer three header, located within the data packet, may be examined by the media router 118. The layer three header comprises IP source and IP destination addresses, and IP source and destination ports, as assigned by the session router 116 or directly assigned to the media router 118. The layer three header is then validated by performing standard IP processing for purposes of ensuring that the multimedia packet is properly formed and valid. Since those of ordinary skill in the art will know what processes are included in IP processing, further discussion of the process is not provided herein.

If the media router 118 allows receipt of the multimedia packet, properties of the received multimedia packet that are stored within the header portion 204 are translated to designate an intended destination address and port. The translation process is described in detail within the '311 patent and is therefore referenced herein. Otherwise, if the media router 118 does not allow receipt of the multimedia packet, the packet is dropped.

The network processor 182 then determines which communication interface 176 of the media router 118 that is to be used for transmission of the received multimedia packet. The network processor 182 determines the communication interface 176 by searching for properties distinguished by the packet header. Preferably, the network processor memory comprises a table, or map list that specifies which communication interface 176 of the media router 118 is to be used for transmitting received multimedia packets to the multimedia packet destination, as is designated by the packet header.

Before transmission of the multimedia packet to a destination address and port, the layer two header of the multimedia packet is determined. The process utilized to determine the layer two header is described below.

Prior Art Method for Determining the Layer Two Header

Figure 5:
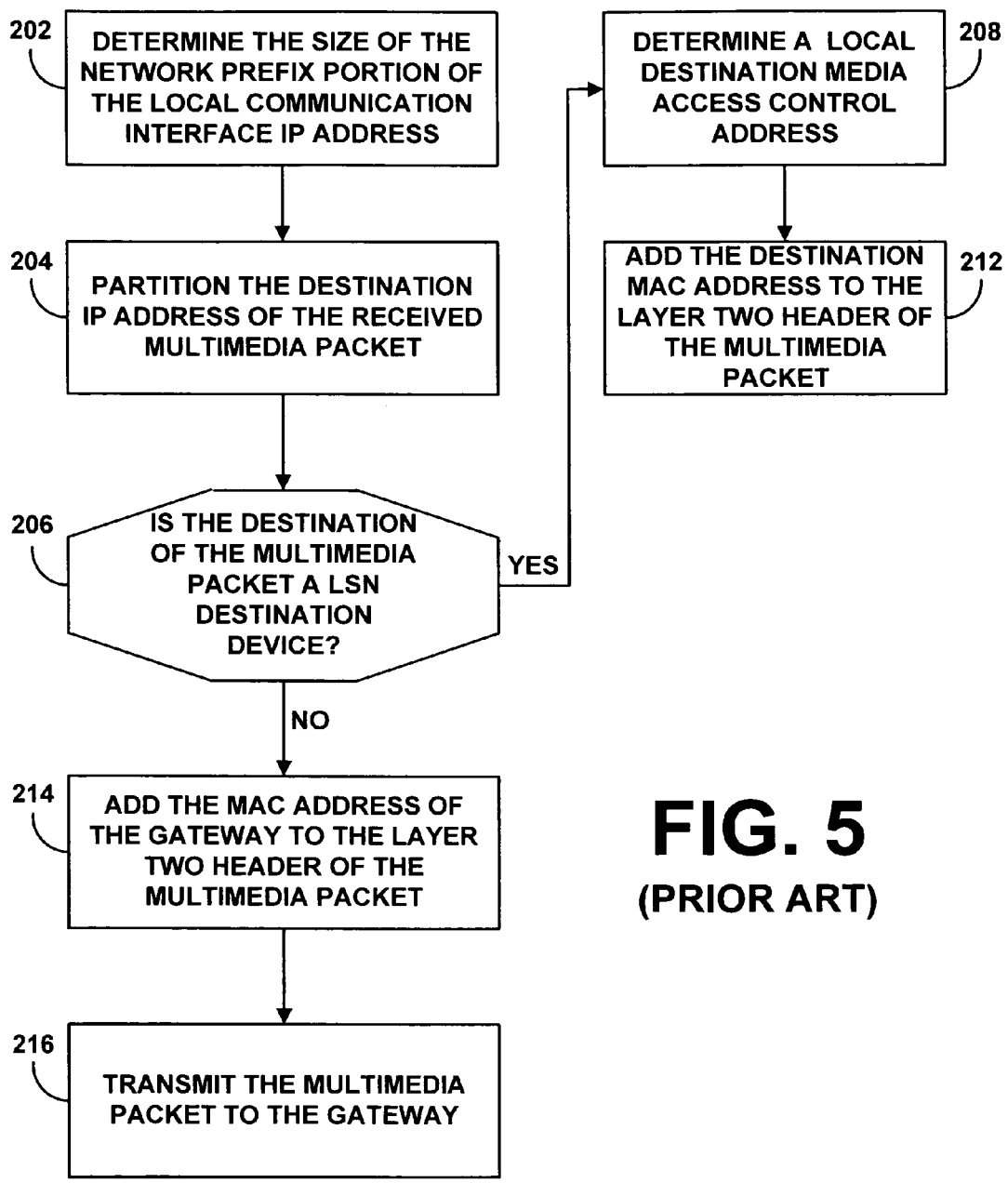
FIG. 5 is a flow chart that illustrates a prior art method that may be utilized to determine a layer two header of a multimedia packet, such as the packet illustrated by FIG. 4.

FIG. 5 is a flow chart that illustrates a prior art method that may be utilized to determine the layer two header. In this regard, each block represents a module, segment, or portion of code, which comprises one or more executable instructions for implementing the specified logical function(s). It should also be noted that in some alternative implementations, the functions noted in the blocks may occur out of the order noted. For example, two blocks shown in succession may in fact be executed substantially concurrently or the blocks may sometimes be executed in the reverse order, depending upon the functionality involved, as will be further clarified hereinbelow.

As shown by block 202, size of a network prefix portion of the local communication interface 176 IP address is determined. It should be noted that the size of the network prefix may differ in accordance with the network utilizing the media router 118. As an example, the network prefix may be designated as twenty-four significant bits, sixteen significant bits, or any other size, as long as the network prefix is less than or equal to the local communication interface 176 IP address size. Preferably, the size of the network prefix is defined within the network processor memory.

Once the intended size of the network prefix has been determined, the destination IP address of the received multimedia packet is partitioned (block 204) to result in a destination prefix that is equal in size to the network prefix of the local communication interface 176 IP address. An example of a method that may be used to partition the destination IP address is masking. The following provides an example of the masking process. If the size of the network prefix is designated as twenty-four bits (1.1.1) and the destination IP address for the multimedia packet is 1.1.1.1, the destination IP address is mathematically ANDed with each bit of the network prefix (AND 1.1.1.1 with F.F.F.0). The result of the masking process is a destination prefix of 1.1.1.

The destination prefix and the network prefix are then used to determine if the destination of the multimedia packet is located within a local subnet. Herein, the term "subnet" represents all machines located at one geographical location. As is known by those of ordinary skill in the art, having the network of an organization network divided into subnets allows the network to be connected to the Internet with a single shared network address.

Figure 6:
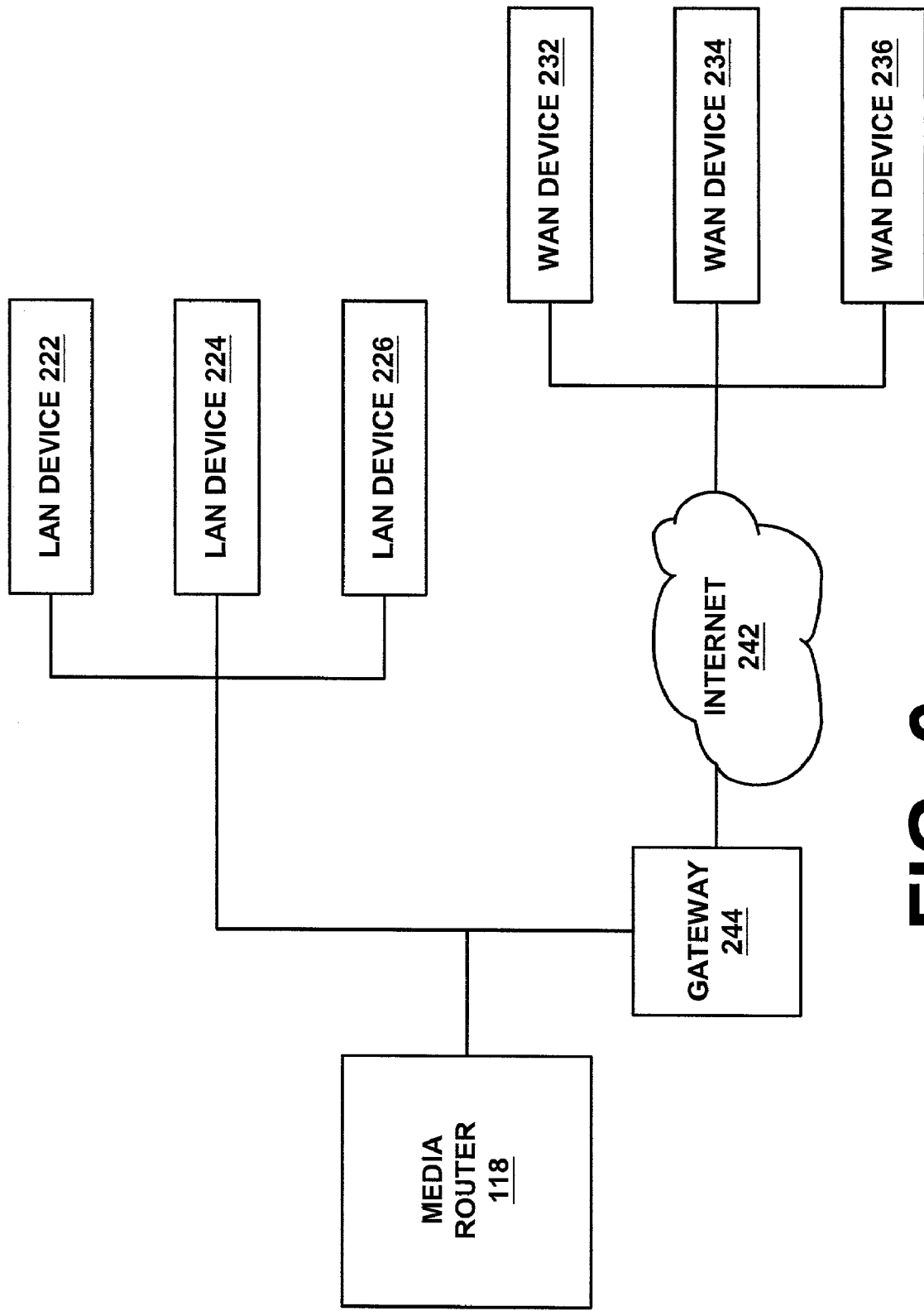
FIG. 6 is a block diagram that illustrates communication between a media router and possible destination devices, wherein the destination devices may be located within a local subnet.

FIG. 6 is a block diagram that illustrates communication between the media router 118 and possible destination devices, wherein the destination devices may be located within the local subnet. It should be noted that LAN and WAN devices are shown by FIG. 6 as examples of devices located within the local subnet, however, other devices may also be utilized. As is shown by FIG. 6, three LAN destination devices are shown 222, 224, 226 and three WAN destination devices are shown 232, 234, 236, wherein the WAN destination devices 232, 234, 236 are connected to the media router 118 via the Internet 242. In addition, a gateway 244 is typically located before the Internet 242 for performing datalink layer conversion from a protocol used for the LAN to a protocol used for the WAN. It should be noted that the session router 116 and/or the second media router 136 may be a LAN destination device 222, 224, 226 and/or a WAN destination device 232, 234, 236.

As is known in the art, LAN destination devices 222, 224, 226 should have a destination prefix that is the same as the network prefix. Therefore, returning to FIG. 5, after partitioning (block 204), bit values of the destination prefix of the LAN destination devices 222, 224, 226 are compared to bit values of the network prefix to determine if the multimedia packet is destined for a LAN destination device 222, 224, 226 (block 206). If the destination prefix bit value of the LAN destination device 222, 224, 226 is equal to the network prefix, then the destination of the multimedia packet is within the LAN. A search is then performed for a layer two destination address of the multimedia packet within the network processor memory to find an associated local destination media access control (MAC) address (block 208). Preferably, a layer two binding table located within the network processor memory stores the destination IP address and associated local destination MAC address. Once the local destination MAC address is found, the local destination MAC address is added to the multimedia packet within the layer two header (block 212).

Alternatively, if the destination prefix bit value of the LAN destination devices 222, 224, 226 is not equal to the network prefix, then the multimedia packet is transmitted to the gateway 244. Therefore, if the destination prefix bit value of the LAN destination devices 222, 224, 226 is not equal to the network prefix, the MAC address of the gateway 244 is added to the multimedia packet as the layer two header (block 214). It should be noted that if there is more than one gateway 244 that may be used by the present routing system, a WAN table might be provided within the network processor memory to determine the intended destination gateway. The WAN table stores the destination IP address and associated gateway address so that the intended destination gateway might be determined.

If the destination prefix bit value of the LAN destination devices 222, 224, 226 is equal to the network prefix, and the layer two binding table does not have the destination IP address therein, the network processor 182 transmits an address resolution request to all LAN destination devices 222, 224, 226. The address resolution request provides the IP address of the multimedia packet to the LAN destination devices 222, 224, 226 so the LAN destination devices 222, 224, 226 can determine if they are the IP destination. If the LAN destination devices 222, 224, 226 are the IP destination, then the LAN destination devices 222, 224, 226 return a destination MAC address to network processor 182. If, however, a reply to the address resolution request is not received from a LAN destination device 222, 224, 226 within a specified time period, the multimedia packet is dropped.

Unfortunately, the above process for determining the layer two header consumes an amount of time that is not permissible for high-speed multimedia transmission performed by the present routing system. Therefore the following process is utilized to provide a fast and efficient method for determining and providing a layer two header, comprising a destination MAC address, to enable high-speed multimedia transmission.

Present Method for Determining the Layer Two Header

Figure 7:
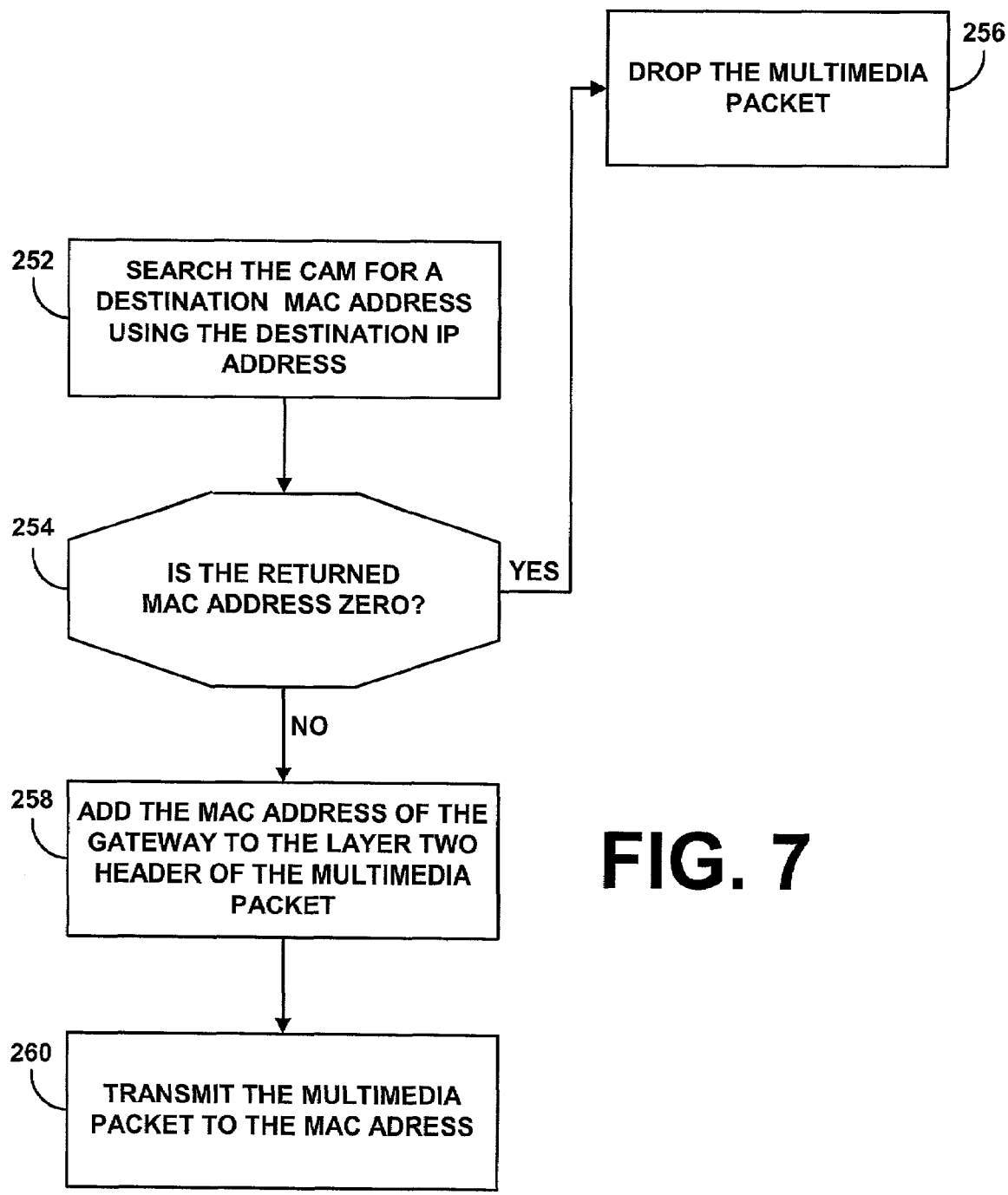
FIG. 7 is a flow chart illustrating a method for determining the layer two header of FIG. 5, in accordance with the preferred embodiment of the invention.

FIG. 7 is a flow chart illustrating the present method for determining the layer two header of a multimedia packet in accordance with the preferred embodiment of the invention. As shown by block 252, the CAM 189 is searched for a destination MAC address by utilizing the layer three destination IP address of the multimedia packet as a key. A query is then made to determine if the MAC address returned from the CAM 189 is equal to zero (0) (block 254). It should be noted herein that, in accordance with the present invention, the CAM 189 is always capable of returning a value in response to a MAC address query.

As shown by block 256, if the value of the returned MAC address is zero, the associated multimedia packet is dropped. However, if the returned MAC address is not zero, then the returned MAC address is added to the layer two header of the multimedia packet (block 258). The multimedia packet is then transmitted to the designated MAC address (block 260). The following further describes determination of the destination MAC address.

As mentioned above, to determine the layer two header, the present routing system utilizes the CAM 189 for storing destination addresses and associated MAC addresses. As shown by FIG. 3, the CAM 189 is located outside of the network processor 182, yet inside of the media router 118. FIG. 8 is a block diagram further illustrating the CAM 189. As is shown by FIG. 8, the CAM 189 comprises a layer two binding table 302 having a destination IP address column 304, a weight column 306, and a destination MAC address column 308, each of which is described in detail below. As is known by those skilled in the art, a CAM is capable of performing searches in single clock cycles. Therefore, use of the CAM 189 results in searching that is much faster than using a convention memory such as the network processor memory. The destination IP address column 304 of the layer two binding table 302 comprises a series of cells comprising destination IP addresses, wherein each cell has an associated weight value and an associated MAC address.

The weight column 306 is utilized to add a weight factor to the destination IP address. The weight factor is utilized in situations where more than one destination IP address is similar, so that a preferred destination IP address may be designated. The following is an example wherein a destination IP address searched for within the layer two binding table 302 is 1.1.1 and two different destination IP addresses within the destination IP address column 304 are 1.1.1 and 1.1.1.2. When a search for the destination IP address within the layer two binding table 302 is performed, both the 1.1.1 and 1.1.1.2 destination IP addresses located within the destination IP address column 304 are proper search results. Therefore, if a higher weight value is provided for the first destination IP address (1.1.1) within the destination IP address column 304, the first destination IP address is selected and an associated MAC address is returned for use as the layer two header. It should be noted that the weight value significance may be established so that higher weight values are a priority or so that lower weight values are a priority.

In accordance with the preferred embodiment of the invention, universal selection bits, designated as X, are assigned within different cells of the destination IP address column 304 to ensure that a destination IP address and associated MAC address may be selected. The following provides a series of examples illustrating use of universal selection bits. FIG. 9 is a block diagram of a layer two binding table 302 that is utilized for the following example demonstrating universal selection bit use. It should be noted that the values utilized within the following example are provided for demonstration purposes. Therefore, other values may be supplemented.

As is shown by FIG. 9, cells within the destination IP address column 302 are as follows: the first cell 322 has a destination IP address of 1.1.1.1; the second cell 324 has a destination IP address of 1.1.1.2; the third cell 326 has a destination IP address of 1.1.1.3; the fourth cell 328 has a destination IP address of 1.1.1.X.; and the fifth cell 332 has a destination IP address of X.X.X.X. Herein, destination IP addresses that do not comprise universal selection bits represent LAN destination devices 222, 224, 226.

It should be noted that the value of the fourth cell 328 is the same as the network prefix, thereby ensuring that a destination IP address that is equivalent to the network prefix, yet different than the destination IP addresses for the LAN destination devices 222, 224, 226, is capable of being selected. Further, the value of the fifth cell 332 is entirely comprised of universal selection bits such that the fifth cell 332 and associated weight and MAC address values are always selected.

The weight value associated with the first cell 322 is 127; the weight value associated with the second cell 324 is 127; the weight value associated with the third cell is 127; the weight value associated with the fourth cell 328 is 64; and the weight value associated with the fifth cell 332 is 32. It should be noted that the weight value associated with the fourth cell 328 is set lower than the first 322, second 324 and third cells 326 because the fourth cell 328 is the same as the network prefix. Therefore, even though the first, second, third and fourth destination IP addresses may be the same as a searched destination IP address, one of the first, second or third destination IP addresses will be selected, and the associated MAC address is utilized as the layer two header. In addition, the weight value associated with the fifth cell 332 is set lower than the weight values associated with all other cells 322, 324, 326, 328 so that it is least likely for the destination IP address of the fifth cell 332 to be selected.

A MAC address associated to each cell is also provided, as is described below. The MAC address associated with the first cell 322 is 0:0:0:0:0:1; the MAC address associated with the second cell 324 is 0:0:0:0:0:2; the MAC address associated with the third cell 326 is 0:0:0:0:0:3; the MAC address associated with the fourth cell 328 is 0:0:0:0:0:0; and the MAC address associated with the fifth cell 332 is 1:2:3:4:5:6. It should be noted that the MAC address associated with the fourth cell 328 is set to 0:0:0:0:0:0 since 0:0:0:0:0:0 is an invalid MAC address. Therefore, when a destination IP address searched within the layer two binding table 302 comprises the same bit values as the fourth cell 328, and not that of the first, second, or third cells 322, 324, 326, it is known that the destination IP address refers to a LAN destination device 222, 224, 226 that does not have layer two binding.

As a result of determining that the destination IP address refers to a LAN destination device 222, 224, 226, and that the MAC address for the LAN destination device 222, 224, 226 is not known, an address search request may be sent to all LAN destination devices 222, 224, 226. If a LAN destination device 222, 224, 226 replies to the address search request, the MAC address of the responding LAN destination device 222, 224, 226 may be entered within the layer two binding table 302 for future reference. Entering of the new relationship between the IP destination address and MAC address may be entered during a refresh stage of the CAM 189. In fact, in accordance with an alternative embodiment of the invention, an address resolution request is periodically transmitted from the communication interface 176 of the media router 118 to the LAN destination devices 222, 224, 226 to update the layer two binding table 302 values. It should also be noted that the multimedia packet may instead be dropped if it is determined that the destination IP address refers to a LAN destination device 222, 224, 226, and that the MAC address for the LAN destination device 222, 224, 226 is not known.

In addition, the MAC address associated with the fifth cell 332 is set to the gateway address. Therefore, if the destination IP address is not found within the first four cells 322, 324, 326, 328, the destination IP address is within the fifth cell 323, thereby returning the MAC address of the gateway to the network processor 158.

Using the layer two binding table 302 of FIG. 9, if the destination IP address 1.1.1.2 is searched within the CAM 189, the second cell 324, the fourth cell 328, and the fifth cell 332 match the request. However, when the associated weight factor for each cell is referenced, it is apparent that the destination IP address of the second cell 324 is the most appropriate destination IP address. Therefore, the MAC address associated with the destination IP address 1.1.1.2, namely, 0:0:0:0:0:2, is returned to the network processor 158 for use as the layer two header of the multimedia packet.

If the destination IP address 1.1.1.20 is searched within the CAM 189, the fourth cell 328 and the fifth cell 332 match the request. However, when the associated weight factor for each cell is referenced, it is apparent that the destination IP address of the fourth cell 328 is the most appropriate destination IP address. As a result of determining that the destination IP address refers to a LAN destination device 222, 224, 226, and that the MAC address for the LAN destination device 222, 224, 226 is not known, an address search request is sent to all LAN destination devices 222, 224, 226. If a LAN destination device 222, 224, 226 replies to the address search request, the MAC address of the responding LAN destination device 222, 224, 226 may be entered within the layer two binding table 302 for future reference.

Alternatively, if the destination IP address 2.2.2.2 is searched within the CAM 189, the destination IP address of the fifth cell 332 matches the request. Therefore, the MAC address associated with the fifth cell 332 is utilized, thereby designating a gateway as the destination for the multimedia packet.

Therefore, due to implementation of universally selected bits and weight factor values within the CAM 189, the routing system is capable of determining if the destination of a multimedia packet is a LAN destination device or a WAN device in a fast and efficient manner.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method for determining a destination for an Internet protocol packet, comprising the steps of:

searching a memory for a destination Internet protocol address associated with said Internet protocol packet, the memory organized into a series of rows, each row including one destination Internet protocol address column, one weight value column, and one destination media access control address column, wherein at least one of said rows comprises a destination Internet protocol address having at least one universal bit, wherein universal bits are bits that accept any value, use of said universal bits ensuring that said step of searching said memory for said destination Internet protocol address associated with said Internet protocol packet results in said memory always having said destination Internet protocol address therein;

utilizing said weight factor to select, from the series, a row matching the destination Internet protocol address;

reading a destination media access control address column from the selected row;

discarding said Internet protocol packet if a value of said destination media access control address is zero; and adding said destination media access control address to said Internet protocol packet as said destination of said packet, if said media access control address is not equal to zero.

2. The method of claim 1, wherein said memory is a content addressable memory.

3. The method of claim 1, wherein said weight factor is utilized to select said row when more than one destination Internet protocol address is similar.

4. A method for determining a destination for an Internet protocol packet, comprising the steps of:

searching a memory for a destination Internet protocol address associated with said Internet protocol packet, the memory organized into a series of rows, each row including one destination Internet protocol address column, one weight value column, and one destination media access control address column, wherein an invalid destination media access control address is provided within a row to designate that said destination for said Internet protocol packet is a local area network destination device;

utilizing said weight factor to select, from the series, a row matching the destination Internet protocol address;

reading a destination media access control address column from the selected row;

transmitting an address search request to said local area network destination device to determine if said local area network destination device is the destination of said Internet protocol packet; and replacing said invalid media access control address with an address of said local area network destination device if said local area network destination device is the destination of said Internet protocol packet.

5. The method of claim 4, further adding said media access control address to a layer two header of said Internet protocol packet.

6. A system for determining a destination for an Internet protocol packet, comprising:

a memory organized into a series of rows, each row including one destination Internet protocol address column, one weight value column, and one destination media access control address column, wherein at least one of said rows comprises a destination Internet protocol address having at least one universal bit, wherein universal bits are bits that accept any value, use of said universal bits ensuring that said step of searching said memory for said destination Internet protocol address associated with said Internet protocol packet results in said memory always having said destination Internet protocol address therein; and a processor, wherein said processor performs the steps of searching said memory for a destination Internet protocol address associated with said Internet protocol packet, utilizing said weight factor to select a row from the series, reading the destination media access control address column from the selected row, discarding said Internet protocol packet if a value of said destination media access control address is zero, and adding said destination media access control address to said Internet protocol racket as said destination of said racket, if said media access control address is not equal to zero.

7. The system of claim 6, wherein said weight factor is utilized to select said row when more than one destination Internet protocol address is similar.

8. A system for determining a destination for an Internet protocol packet, comprising:

a memory organized into a series of rows, each row including one destination Internet protocol address column, one weight value column, and one destination media access control address column, wherein an invalid destination media access control address is provided within a row to designate that said destination for said Internet protocol packet is a local area network destination device; and a processor, wherein said processor performs the steps of searching said memory for a destination Internet protocol address associated with said Internet protocol packet, utilizing said weight factor to select a row from the series, reading the destination media access control address column from the selected row, transmitting an address search request to said local area network destination device to determine if said local area network destination device is the destination of said Internet protocol packet, and replacing said invalid media access control address with an address of said local area network destination device if said local area network destination device is the destination of said Internet protocol packet.

9. The system of claim 8, wherein said memory is a content addressable memory.

10. A system for determining a destination for an Internet protocol packet, comprising:

means for searching a memory for a destination Internet protocol address associated with said Internet protocol packet, the memory organized into a series of rows, each row including one destination Internet protocol address column, one weight value column, and one destination media access control address column, wherein at least one of said rows comprises a destination Internet protocol address having at least one universal bit, wherein universal bits are bits that accept any value, use of said universal bits ensuring that said means for searching said memory for said destination Internet protocol address associated with said Internet protocol packet always finding said destination Internet protocol address within said memory;

means for utilizing said weight factor to select a row from the series;

means for reading the destination media access control address column from the selected row;

means for discarding said Internet protocol packet if a value of said destination media access control address is zero; and means for adding said destination media access control address to said Internet protocol packet as said destination of said packet, if said media access control address is not equal to zero.

11. The method of claim 10, wherein said memory is a content addressable memory.

12. A system for determining a destination for an Internet protocol packet, comprising:

means for searching a memory for a destination Internet protocol address associated with said Internet protocol packet, the memory organized into a series of rows, each row including one destination Internet protocol address column, one weight value column, and one destination media access control address column, wherein an invalid destination media access control address is provided with a row to designate that said destination for said Internet protocol packet is a local area network destination device;

means for utilizing said weight factor to select a row from the series;

means for reading the destination media access control address column from the selected row;

means for transmitting an address search request to said local area network destination device to determine if said local area network destination device is the destination of said Internet protocol packet; and means for replacing said invalid media access control address with an address of said local area network destination device if said local area network destination device is the destination of said Internet protocol packet.

13. The system of claim 12, wherein said weight factor is utilized to select said row when more than one destination Internet protocol address is similar.

* * * * *